United States Patent
Hiwatari et al.

(10) Patent No.: US 10,491,774 B1
(45) Date of Patent: Nov. 26, 2019

(54) INFORMATION PROCESSING APPARATUS

(71) Applicant: KYOCERA DOCUMENT SOLUTIONS INC., Osaka (JP)

(72) Inventors: Tatsuya Hiwatari, Concord, CA (US); Hiroshi Manabe, Concord, CA (US); Daisaku Nagano, Concord, CA (US); Dai Shigenobu, Concord, CA (US); Takehiko Asano, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/227,446

(22) Filed: Dec. 20, 2018

(51) Int. Cl.
    H04N 1/00 (2006.01)
(52) U.S. Cl.
    CPC ..... *H04N 1/00938* (2013.01); *H04N 1/00129* (2013.01); *H04N 1/00413* (2013.01); *H04N 2201/0094* (2013.01)
(58) Field of Classification Search
    CPC .................................................. H04N 1/00938
    USPC ....................................................... 358/1.15
    See application file for complete search history.

(56) References Cited

FOREIGN PATENT DOCUMENTS

JP    2017-224292 A    12/2017

*Primary Examiner* — Jacky X Zheng
(74) *Attorney, Agent, or Firm* — Li & Cai Intellectual Property (USA) Office

(57) ABSTRACT

A storage device stores device configuration definitions including a plurality of device image parts indicating the image forming apparatus and one or more devices physically attachable to the image forming apparatus, respectively, a plurality of device image definitions defining the plurality of device image parts with respect to a plurality of device identifiers identifying the image forming apparatus and the one or more devices, respectively, and a plurality of device offset information definitions defining offset amounts with respect to the plurality of device identifiers, respectively, the offset amounts indicating relative positions of the plurality of device image parts, respectively. A processor operates as a device image processor carried out by a software executing module, the software executing module being configured to execute a software program for driving and/or managing the image forming apparatus on an OS, and a device image module configured to communicate with the device image processor.

4 Claims, 14 Drawing Sheets

INFORMATION PROCESSING APPARATUS

BACKGROUND OF THE INVENTION

1. Field of the Invention

The present disclosure relates to an information processing apparatus configured to drive and/or manage an image forming apparatus and display an image of the image forming apparatus on a display device.

2. Description of Related Art

When an information processing apparatus (personal computer) executes a software program for driving and/or managing an image forming apparatus, the information processing apparatus displays images showing the image forming apparatus and devices attached to the image forming apparatus on a display device.

SUMMARY OF THE INVENTION

According to an embodiment of a present disclosure, there is provided an information processing apparatus, including:
a communication interface configured to communicate with an image forming apparatus;
a display device;
a storage device that stores device configuration definitions including
a plurality of device image parts indicating the image forming apparatus and one or more devices physically attachable to the image forming apparatus, respectively,
a plurality of device image definitions defining the plurality of device image parts with respect to a plurality of device identifiers identifying the image forming apparatus and the one or more devices, respectively, and
a plurality of device offset information definitions defining offset amounts with respect to the plurality of device identifiers, respectively, the offset amounts indicating relative positions of the plurality of device image parts, respectively; and
a processor configured to operate as
a device image processor carried out by a software executing module, the software executing module being configured to execute a software program for driving and/or managing the image forming apparatus on an OS (Operation System), and
a device image module configured to communicate with the device image processor,
the device image processor being configured to
obtain a plurality of device identifiers identifying the image forming apparatus and one or more devices actually attached to the image forming apparatus, respectively, the plurality of device identifiers being received by the software executing module from the image forming apparatus, and
send the plurality of obtained device identifiers to the device image module,
the device image module being configured to
receive the plurality of device identifiers from the device image processor,
read, from the device configuration definition, a plurality of device image definitions defined with respect to the plurality of received device identifiers, respectively,
read, from the device configuration definition, a plurality of device offset information definitions defined with respect to the plurality of received device identifiers, respectively, and
send the plurality of read device image definitions and the plurality of read device offset information definitions to the device image processor,
the device image processor being configured to
receive the plurality of device image definitions and the plurality of device offset information definitions from the device image module,
read, from the device configuration definition, a plurality of device image parts defined by the plurality of received device image definitions,
arrange the plurality of read device image parts on a plurality of offset positions defined by the plurality of received device offset information definitions, respectively, to thereby generate a composite image, and
cause the software executing module to display the composite image on the display device.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Hardware Configuration of Information Processing Apparatus

Figure 1:
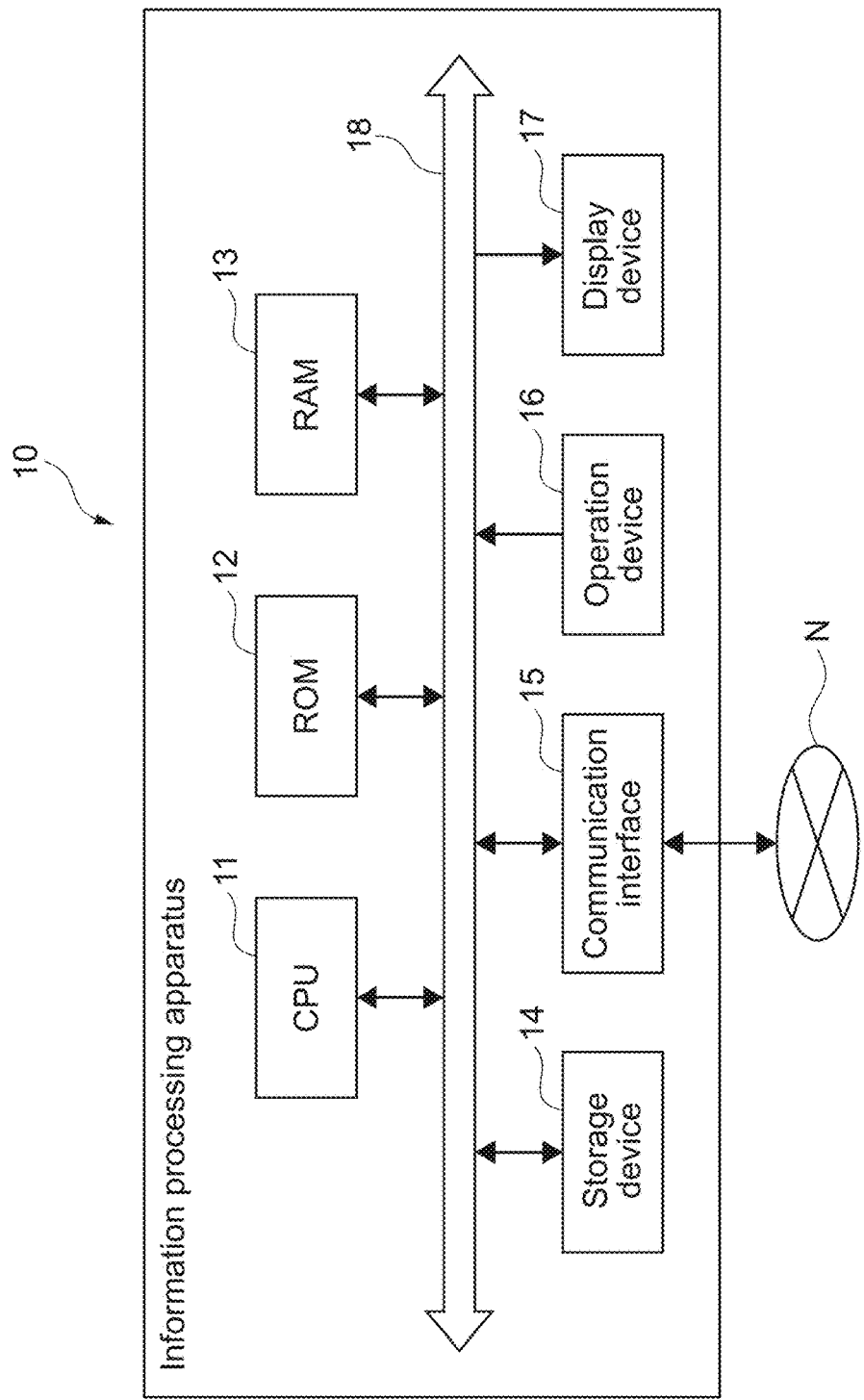
FIG. 1 shows a hardware configuration of an information processing apparatus according to an embodiment of the present disclosure.

FIG. 1 shows a hardware configuration of an information processing apparatus according to an embodiment of the present disclosure.

The information processing apparatus 10 is, typically, a personal computer or a tablet device. The information processing apparatus 10 includes the CPU (Central Processing Unit) 11 (processor), the ROM (Read Only Memory) 12 (memory), the RAM (Random Access Memory) 13, the storage device 14 (memory), the communication interface 15, the operation device 16, the display device 17, and the bus 18 connecting them each other.

The CPU 11 (processor) loads a plurality of information processing programs stored in the ROM 12 (memory) in the RAM 13 and executes the information processing programs. The ROM 12 fixedly stores the programs executed by the CPU 11, data, and the like. The ROM 12 is an example of a non-transitory computer readable recording medium.

The storage device 14 is a large-volume recording medium such as an HDD (Hard Disk Drive) and an SSD (Solid State Drive). The storage device 14 includes an external recording medium such as a USB (Universal Serial Bus) memory.

The operation device 16 includes a touch pad, a keyboard, a mouse, various switches, and the like. The operation device 16 detects operations input by a user, and outputs signals to the CPU 11. The operation device 16 is an embodiment of an input device. The information processing apparatus 10 may include, as an input device, a sound input device such as a microphone.

The display device 17 includes an LCD, an organic EL display, or the like. The display device 17 receives information from the CPU 11, executes computing process on the basis of the received information, and displays generated image signals on a screen. The display device 17 may be an external display device.

The communication interface 15 is an interface for connecting to the network N. The communication interface 15 is capable of communicating with the image forming apparatus 20 the network N such as the Internet or a LAN (Local Area Network).

The image forming apparatus 20 is, typically, an MFP (Multifunction Peripheral) or a production printer. One or more devices (in the present embodiment, a plurality of devices) (paper cassettes, finishers, etc. Not shown.) are physically attachable to the image forming apparatus 20. The "physically attachable devices" are, in other words, physically detachable from the image forming apparatus 20.

2. Functional Configuration of Information Processing Apparatus

Figure 2:
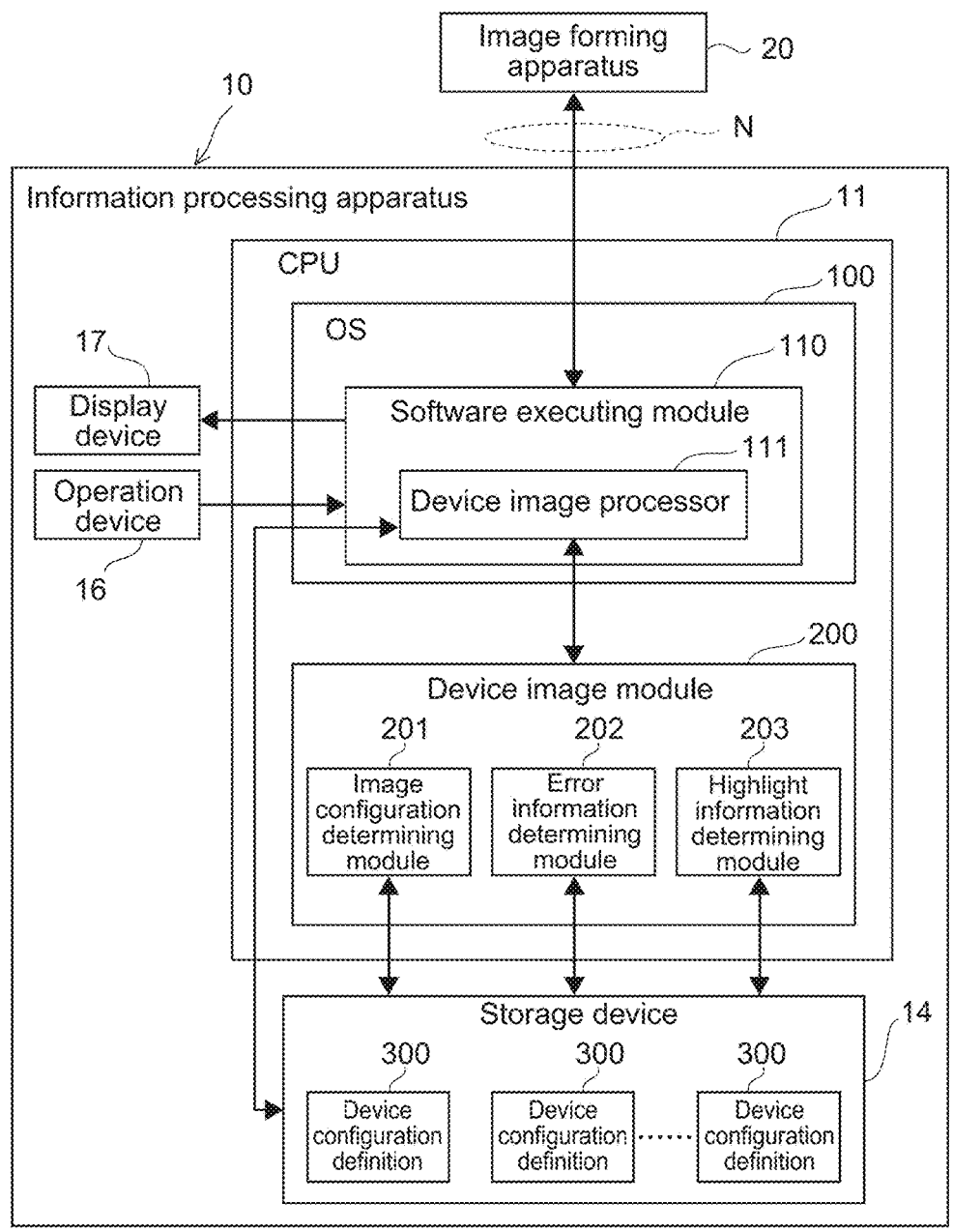
FIG. 2 shows a functional configuration of the information processing apparatus.

FIG. 2 shows a functional configuration of the information processing apparatus.

The CPU 11 of the information processing apparatus 10 executes the OS (Operation System) 100. The OS 100 is a platform such as Windows (registered trademark), Mac (registered trademark), or Linux (registered trademark), for example.

The software executing module 110 executes a software program for driving and/or managing the image forming apparatus 20 on the OS 100. Therefore a software program executed by the software executing module 110 is different according to each type of the OS 100, i.e., depends on the type of the OS 100. An example of the "software program for driving the image forming apparatus 20" is a printer driver. For example, a printer driver is configured to display a menu window image including a plurality of items on the display device 17, determine one item selected via the operation device 16, and cause the image forming apparatus 20 to execute an operation depending on the selected item.

An example of the "software program for managing the image forming apparatus 20" is a device manager software. For example, a device manager software program is configured to display, on the display device 17, a window showing properties or errors of the image forming apparatus 20 and a plurality of devices actually attached to the image forming apparatus 20.

The software executing module 110 carries out the device image processor 111 as a sub module. The device image processor 111 is also different according to each type of the OS 100, i.e., depends on the type of the OS 100. When the software executing module 110 displays the aforementioned window on the display device 17, the device image processor 111 generates images of the image forming apparatus 20 and the plurality of devices actually attached to the image forming apparatus 20.

The CPU 11 of the information processing apparatus 10 further executes the device image module 200. The device image module 200 is common to every type of the OS 100, i.e., is independent of the type of the OS 100. The device image module 200 supplies, to the device image processor 111, a plurality of image parts that configure images to be displayed on the display device 17 and other information (described later).

The device image module 200 includes the image configuration determining module 201, the error information determining module 202, and the highlight information determining module 203. The image configuration determining module 201, the error information determining module 202, and the highlight information determining module 203 determine a plurality of image parts and other information (described later) to be supplied to the device image processor 111 with reference to the plurality of device configuration definitions 300 stored in the storage device (the operations will be described later with reference to operational flows).

The storage device 14 stores the plurality of device configuration definitions 300. The plurality of device configuration definitions 300 are in one-to-one association with a plurality of model identifiers, respectively, the plurality of model identifiers identifying a plurality of models of the image forming apparatus 20, respectively. Each device configuration definition 300 is described in XML (Extensible Markup Language).

3. Data Structure of Device Configuration Definition

Figure 3:
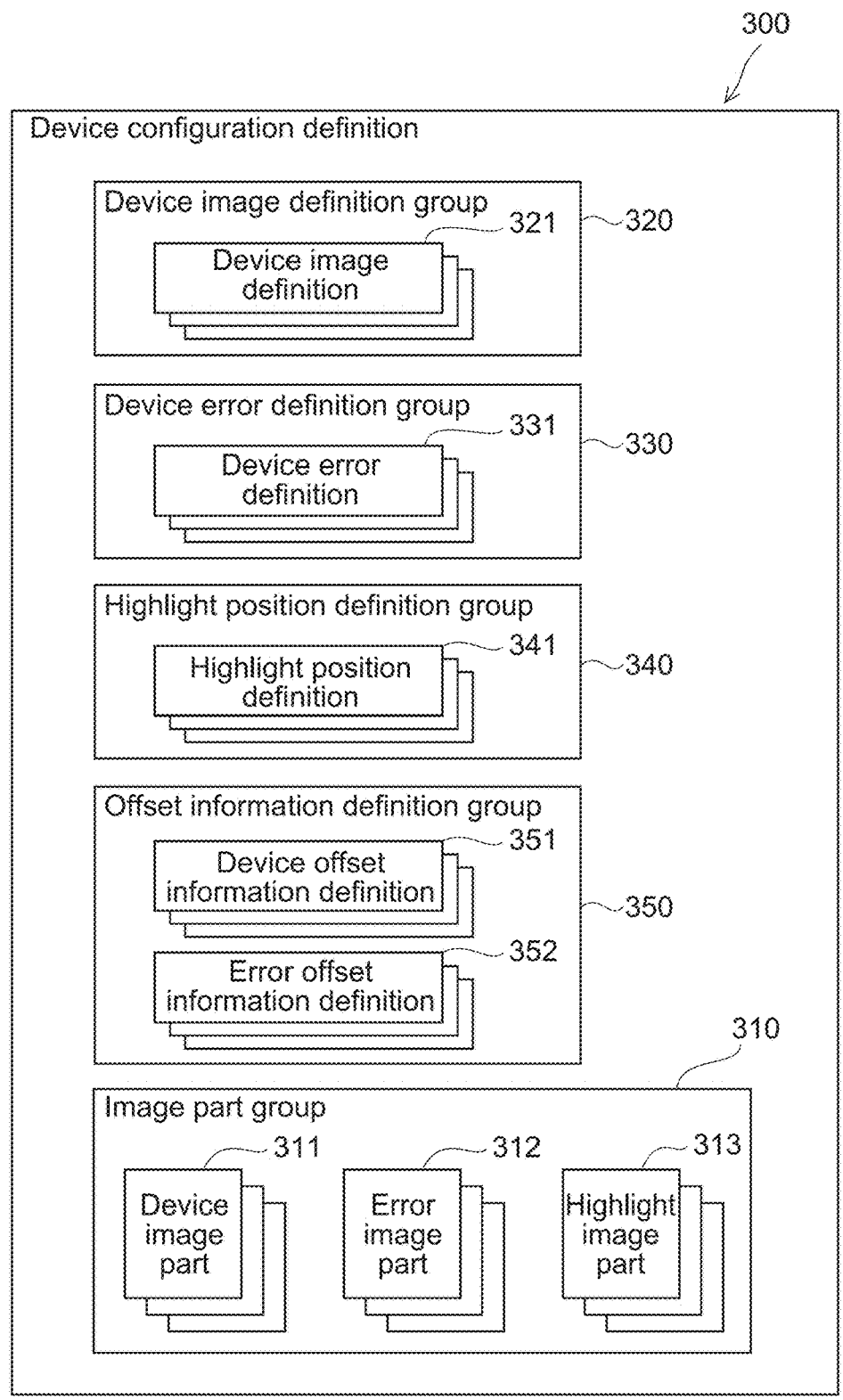
FIG. 3 shows a data structure of a device configuration definition.

FIG. 3 shows a data structure of a device configuration definition.

One device configuration definition 300 will be described. One device configuration definition 300 is stored in the storage device 14 in association with a model identifier identifying one specific model of the image forming apparatus 20. The device configuration definition 300 includes the image part group 310, the device image definition group 320, the device error definition group 330, the highlight position definition group 340, and the offset information definition group 350.

The image part group 310 includes the plurality of device image parts 311, the one or more error image parts 312 (in the present embodiment, the plurality of error image parts 312), and the one or more highlight image parts 313. Those image parts 311, 312, and 313 are, for example, PNG (Portable Network Graphics) images.

Figure 4:
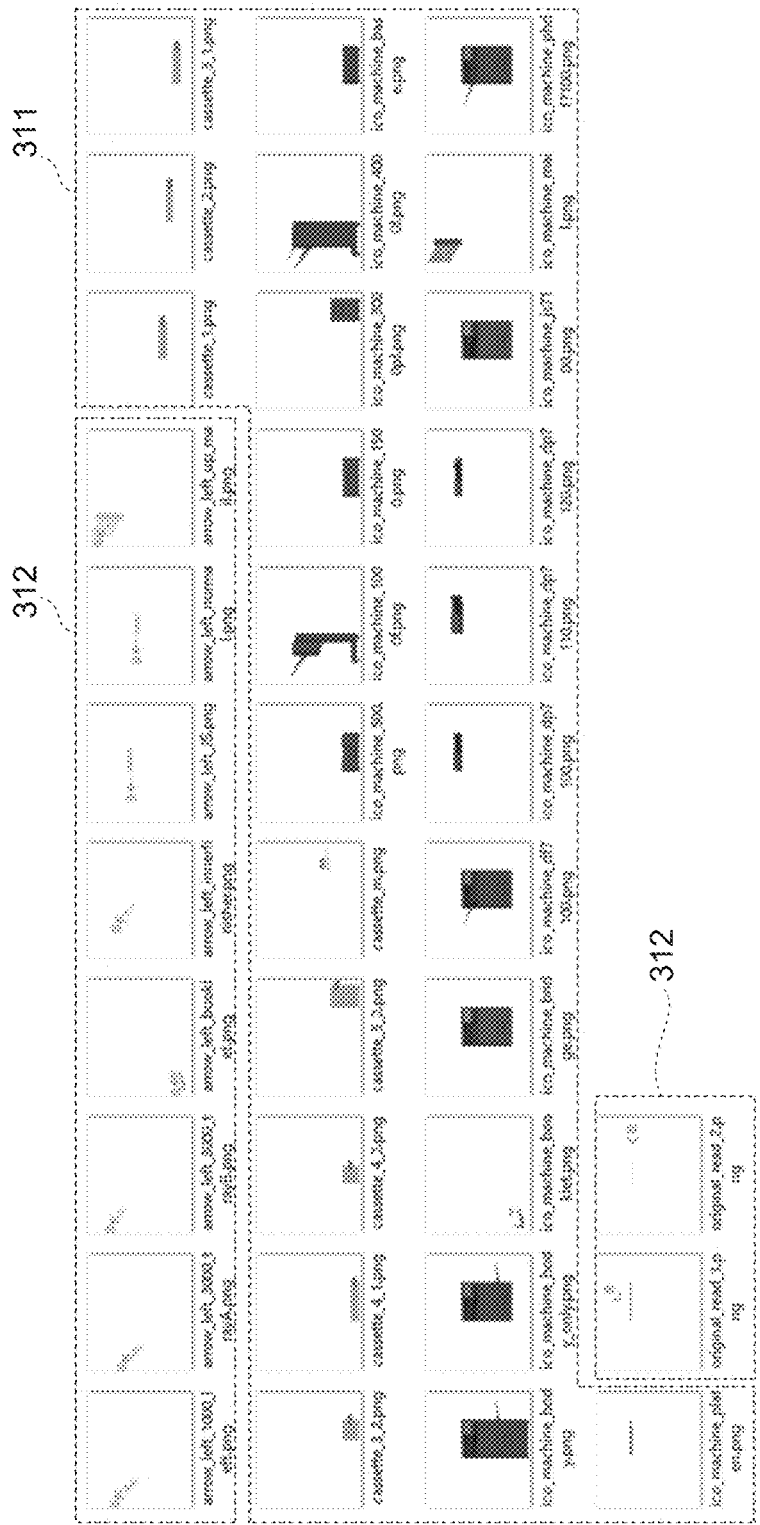
FIG. 4 shows examples of a plurality of device image parts and a plurality of error image parts.

FIG. 4 shows examples of a plurality of device image parts and a plurality of error image parts.

The plurality of device image parts 311 show the image forming apparatus 20 and a plurality of devices physically attachable to the image forming apparatus 20, respectively. In the examples of FIG. 4, the plurality of device image parts 311 are images showing bodies of the image forming apparatus 20, paper cassettes, a platen, a booklet, a bridge, a base, mail boxes, and the like, respectively. A plurality of different device image parts 311 may be prepared for one device. For example, there may be prepared a device image part 311 showing a status where one paper cassette is closed and another device image part 311 showing a status where the same paper cassette is open.

The plurality of error image parts 312 show errors, respectively. In the examples of FIG. 4, the plurality of error image parts 312 include arrows in different directions, and images of icons showing combinations of devices and arrows, respectively. The plurality of error image parts 312 may further include images of icons showing marks each including a combination of an object showing a trouble or an alert, a symbol, and a color (red, yellow, etc.). The plurality of error image parts 312 may further include texts (messages) indicating troubles or alerts. Further, for example, with respect to one paper cassette, one device image part 311 showing a status where one paper cassette is closed may be used as a device image part 311 showing the normal status. Meanwhile, another device image part 311 showing a status where the same paper cassette is open may be used as an error image part 312.

Each of the highlight image parts 313 is an image for highlighting one item selected via the operation device 16 out of a plurality of items included in a menu window image displayed by the software executing module 110 on the display device 17.

The device image definition group 320 includes the plurality of device image definitions 321. The plurality of device image definitions 321 define the plurality of device image parts 311 with respect to a plurality of device identifiers, respectively, the plurality of device identifiers identifying the image forming apparatus 20 and the plurality of devices, respectively. Specifically, the device image definition 321 is information for making a device identifier, which identifies the image forming apparatus 20 or a device, and a device image part 311 in association with each other. More specifically, the device image definition 321 defines, for example, an image file name of one device image part 311 with respect to one device identifier.

The device error definition group 330 includes the plurality of device error definitions 331. The plurality of device error definitions 331 define the plurality of error image parts 312 with respect to one or more error identifiers, respectively, the one or more error identifiers identifying a plurality of error types, respectively. Specifically, the device error definition 331 is information making an error identifier (for example, error code) identifying a type of an error, which occurs in the image forming apparatus 20 or a device, and an error image part 312 in association with each other. More specifically, the device error definition 331 defines, for example, one error image part 312 with respect to one error identifier (for example, error code).

The highlight position definition group 340 includes the plurality of highlight position definitions 341. The highlight position definitions 341 define a plurality of positions of the plurality of items with respect to the menu window image displayed on the display device 17, respectively.

The offset information definition group 350 includes the plurality of device offset information definitions 351 and the plurality of error offset information definitions 352.

The plurality of device offset information definitions 351 define offset amounts with respect to the plurality of device identifiers, respectively, the offset amounts indicating relative positions of the plurality of device image parts 311, respectively. Specific examples of the "offset amounts" will be described. For example, a predetermined position of the device image part 311 showing the body of the image forming apparatus 20 is treated as the origin of the XY coordinate. The "predetermined position" may be, for example, the center point, the left-top corner point, or the like of the device image part 311. In order to composite the device image part 311 showing the body of the image forming apparatus 20 and the device image part 311 of the paper cassette actually attached to the image forming apparatus 20 and display the composite image on the display device 17, the device image part 311 of the paper cassette is offset with respect to the center of the device image part 311 showing the body of the image forming apparatus 20 by a certain amount (XY value). The offset amount means this amount (XY value).

The plurality of error offset information definitions 352 define relative positions of the plurality of error image parts 312 with respect to the plurality of device image parts 311, respectively, with respect to combinations of a plurality of error identifiers and a plurality of device identifiers, respectively. A specific example will be described. For example, with respect to a combination of an error identifier identifying an error "paper jam" and a device identifier identifying a device "paper cassette", the error image part 312 is offset with respect to the center of the device image part 311 of the body of the image forming apparatus 20. At this time, the offset amount may be, for example, approximately the same as the amount (XY value) by which the device image part 311 of the paper cassette is offset with respect to the center of the device image part 311 showing the body of the image forming apparatus 20. As a result, the error image part 312 is displayed on the device image part 311 of the paper cassette (i.e., location in which error occurs).

Figure 5:
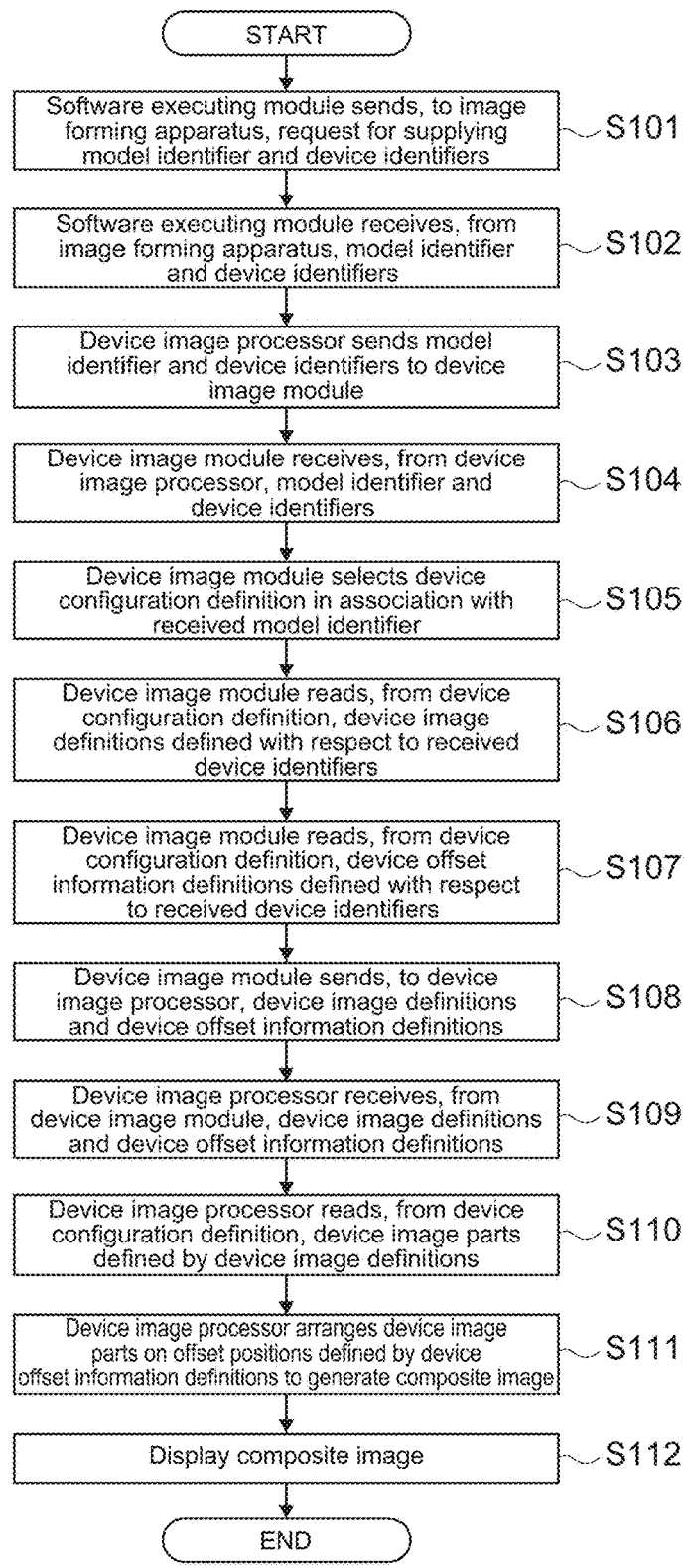
FIG. 5 shows a first operational flow of the information processing apparatus (when displaying composite image)

4. Operation Information Processing Apparatus (1) Operation of Displaying Composite Image FIG. 5 shows a first operational flow of the information processing apparatus (when displaying composite image).

The software executing module 110 sends, to the image forming apparatus 20 being driven and/or managed, via the network N, a request for supplying a model identifier identifying a model of the image forming apparatus 20 and a plurality of device identifiers identifying a plurality of devices actually attached to the image forming apparatus 20, respectively (Step S101). The software executing module 110 receives, from the image forming apparatus 20 via the network N, a model identifier and a plurality of device identifiers (Step S102). For example, communication between the software executing module 110 and the image forming apparatus 20 may be carried out by SNMP (Simple Network Management Protocol) and SOAP (Simple Object Access Protocol). Alternatively, if the information processing apparatus 10 is connected to the image forming apparatus 20 not via the network N (e.g., connected via USB), communication between the software executing module 110 and the image forming apparatus 20 may be carried out by, for example, PJL (Printer Job Language). The software executing module 110 supplies, to the device image processor 111, the received model identifier and plurality of device identifiers.

The device image processor 111 obtains the model identifier and the plurality of device identifiers received by the software executing module 110 from the image forming apparatus 20. The device image processor 111 sends the model identifier and the plurality of device identifiers to the device image module 200 (Step S103). For example, the device image processor 111 may send, to the device image module 200, the model identifier and the plurality of device identifiers by using JSON (JavaScript Object Notation).

The device image module 200 receives, from the device image processor 111, the model identifier and the plurality of device identifiers (Step S104). The image configuration determining module 201 of the device image module 200 selects one device configuration definition 300 in association with the received model identifier (Step S105). The image configuration determining module 201 reads, from the device image definition group 320 of the selected device configuration definition 300, the plurality of device image definitions 321 defined with respect to the plurality of received device identifiers, respectively (Step S106). The image configuration determining module 201 reads, from the offset information definition group 350 of the device configuration definition 300, the plurality of device offset information definitions 351 defined with respect to the plurality of received device identifiers, respectively (Step S107). The device image module 200 sends, to the device image processor 111, the plurality of device image definitions 321 and the plurality of device offset information definitions 351 read by the image configuration determining module 201 (Step S108).

The device image processor 111 receives, from the device image module 200, the plurality of device image definitions 321 and the plurality of device offset information definitions 351 (Step S109). The device image processor 111 reads, from the image part group 310 of the device configuration definition 300, the plurality of device image parts 311 defined by the plurality of received device image definitions 321 (Step S110). The device image processor 111 arranges the plurality of read device image parts 311 on a plurality of offset positions defined by the plurality of received device offset information definitions 351, respectively, to thereby generate the composite image 400 (Step S111).

Figure 6:
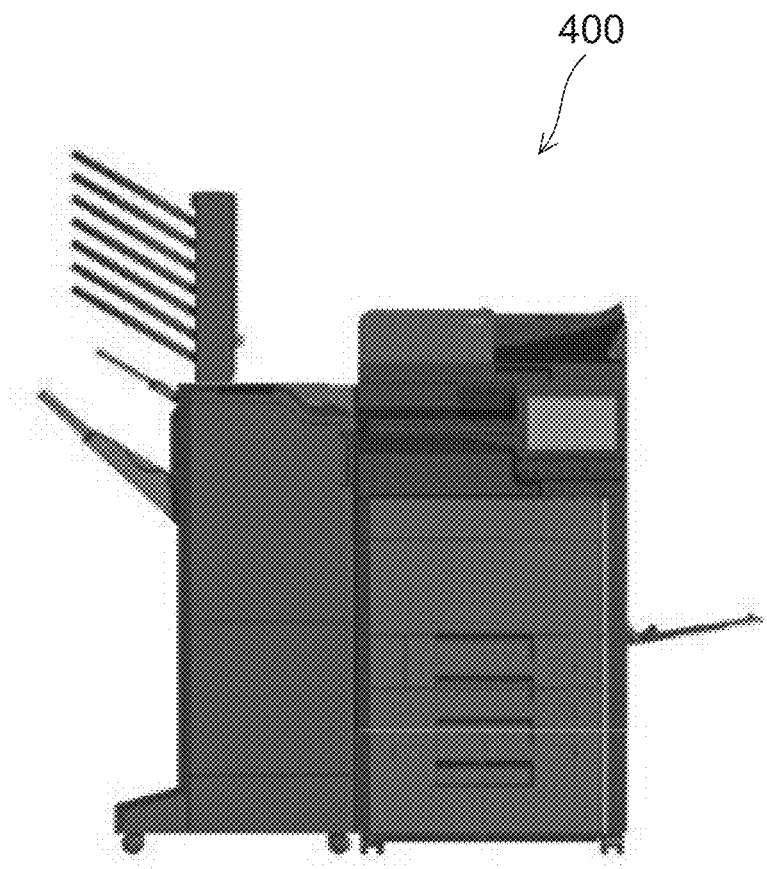
FIG. 6 shows an example of a composite image.

FIG. 6 shows an example of a composite image.

The device image processor 111 causes the software executing module 110 to display the generated composite image 400 on the display device 17 (Step S112).

(2) Operation at Time of Occurrence of Error

Figure 7:
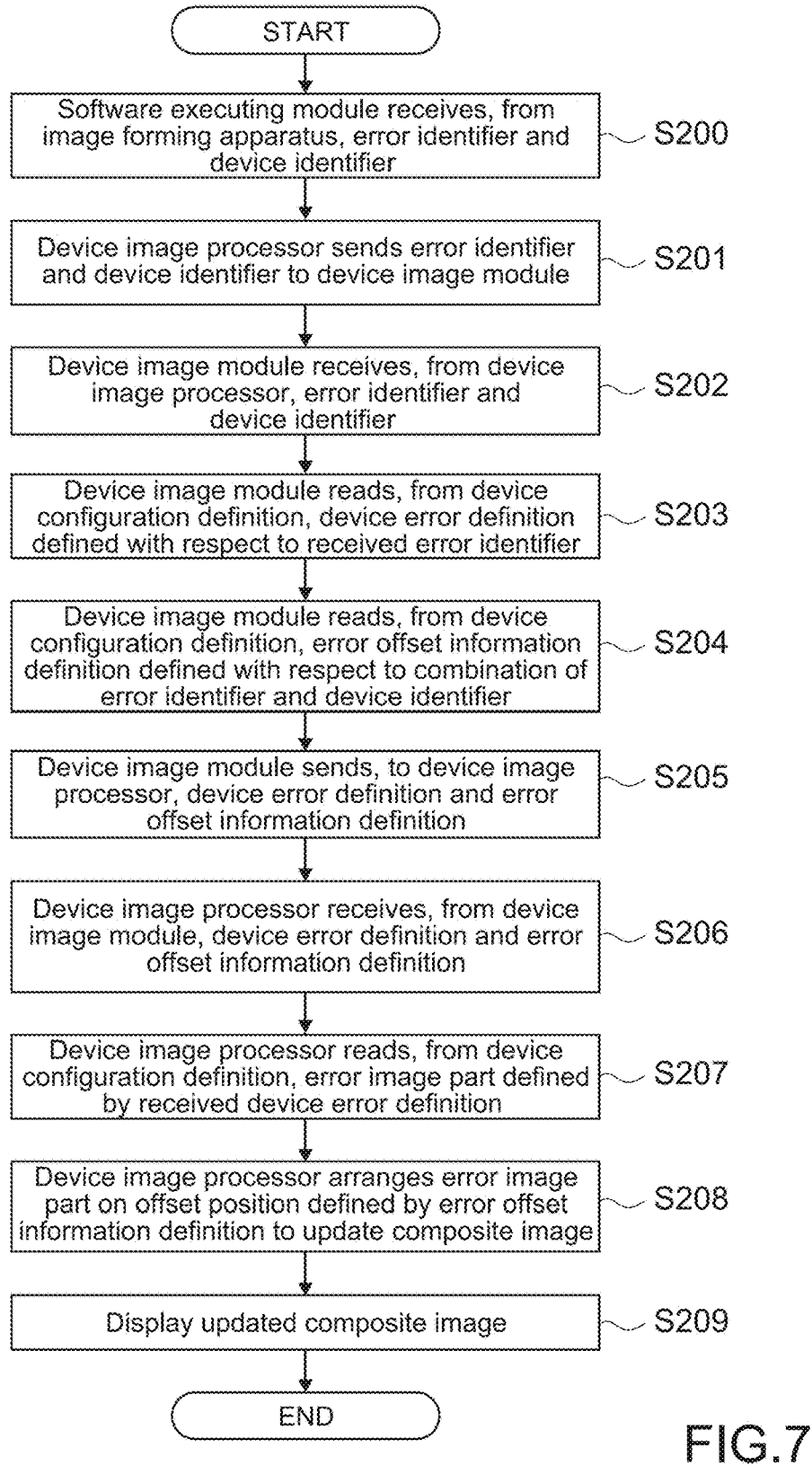
FIG. 7 shows a second operational flow of the information processing apparatus (when error occurs)

FIG. 7 shows a second operational flow of the information processing apparatus (when error occurs).

The present operation will be executed in the status where the software executing module 110 displays the composite image on the display device 17 (Step S112).

An error occurs in the image forming apparatus 20 or one of the plurality of devices actually attached to the image forming apparatus 20. Then the image forming apparatus 20 sends, to the information processing apparatus 10 via the network N, an error identifier (for example, error code) and a device identifier identifying the image forming apparatus 20 or one of the plurality of devices in which an error occurs.

The software executing module 110 of the information processing apparatus 10 receives, from the image forming apparatus 20 via the network N, an error identifier and a device identifier (Step S200). The software executing module 110 supplies, to the device image processor 111, the received error identifier and device identifier. The device image processor 111 obtains the error identifier and the device identifier received by the software executing module 110 from the image forming apparatus 20. The device image processor 111 sends the error identifier and the device identifier to the device image module 200 (Step S201).

The device image module 200 receives, from the device image processor 111, the error identifier and the device identifier (Step S202). The error information determining module 202 of the device image module 200 reads, from the device error definition group 330 of the selected device configuration definition 300, the device error definition 331 defined with respect to the plurality of received error identifier (Step S203). The error information determining module 202 reads, from the offset information definition group 350 of the device configuration definition 300, the error offset information definition 352 defined with respect to the combination of the received error identifier and the received device identifier (Step S204). The device image module 200 sends, to the device image processor 111, the device error definition 331 and the error offset information definition 352 read by the error information determining module 202 (Step S205).

The device image processor 111 receives, from the device image module 200, the device error definition 331 and the error offset information definition 352 (Step S206). The device image processor 111 reads, from the image part group 310 of the device configuration definition 300, the error image part 312 defined by the received device error definition 331 (Step S207). The device image processor 111 arranges the read error image part 312 on an offset position defined by the received error offset information definition 352 to thereby update the composite image 400 including the plurality of device image parts 311 (Step S208).

The device image processor 111 causes the software executing module 110 to display the updated composite image 401 on the display device 17 (Step S209).

Figure 8:
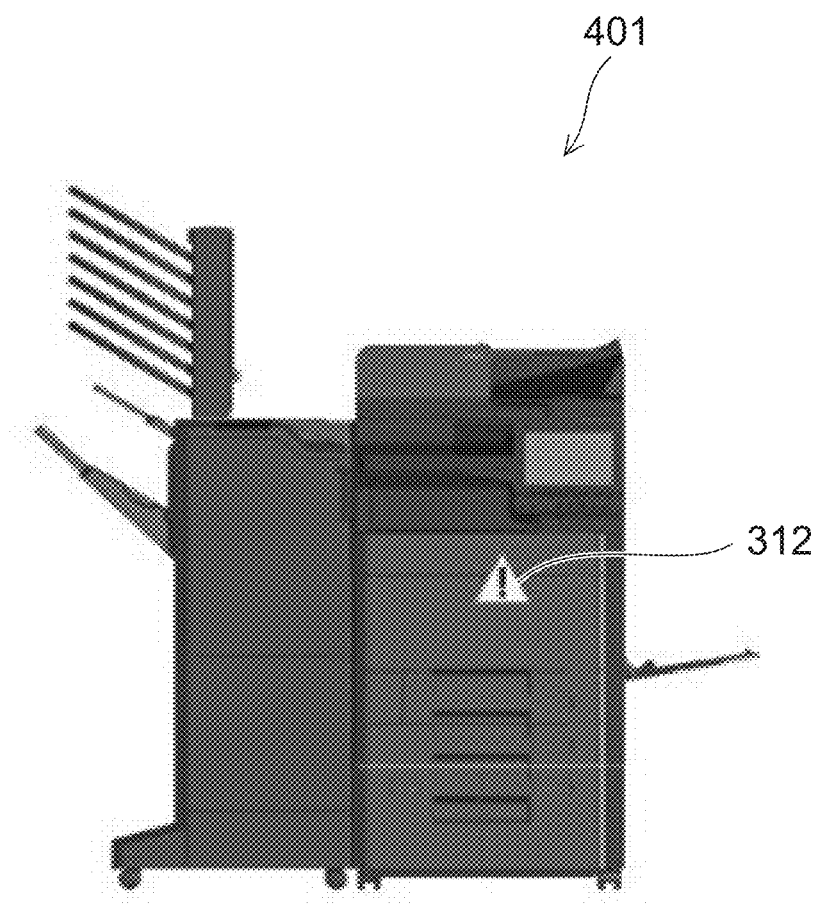
FIG. 8 shows an example of a composite image updated when an error occurs.

FIG. 8 shows an example of a composite image updated when an error occurs.

The updated composite image 401 includes one error image part 312. In this example, the error image part 312 is an image part of an icon showing a mark including a combination of an object showing a trouble or an alert, a symbol, and a color (red, yellow, etc.).

Figure 9:
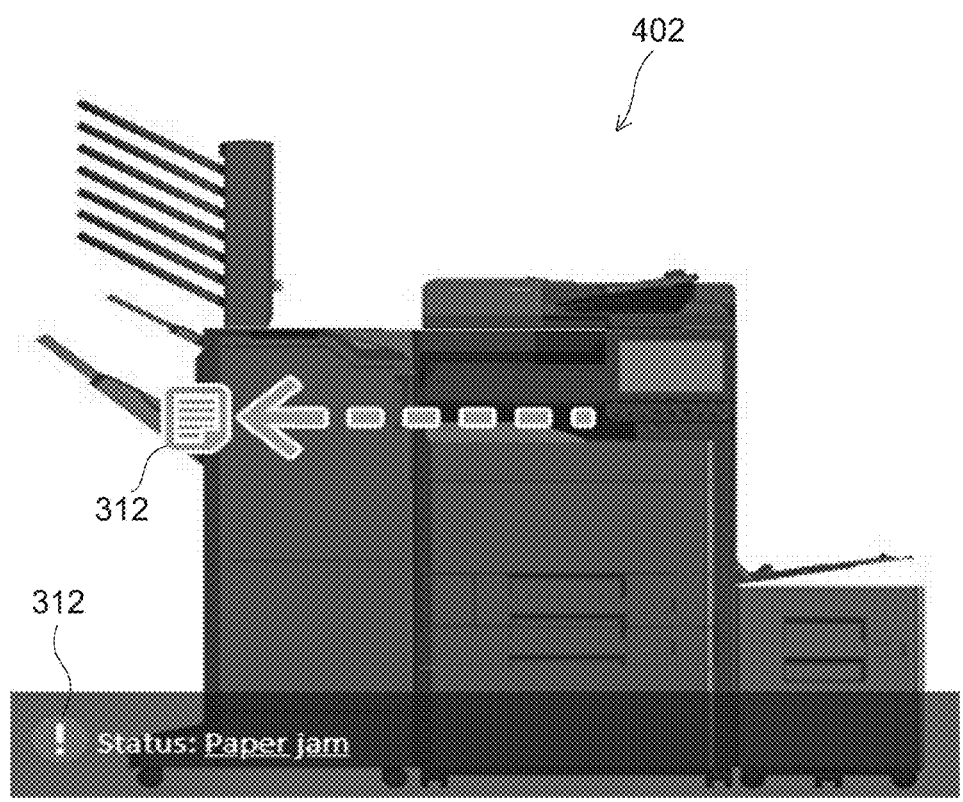
FIG. 9 shows another example of a composite image updated when an error occurs.

FIG. 9 shows another example of a composite image updated when an error occurs.

The updated composite image 402 includes a plurality of error image parts 312. In this example, one error image part 312 is an image part of an icon showing a combination of a document and an arrow. The other error image part 312 includes an image of an icon showing a mark including a combination of an object showing a trouble or an alert, a symbol, and a color (red, yellow, etc.).

Figure 10:
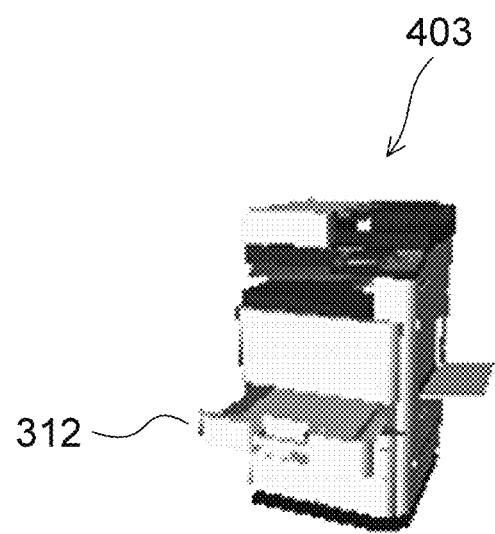
FIG. 10 shows another example of a composite image updated when an error occurs.

FIG. 10 shows another example of a composite image updated when an error occurs.

The updated composite image 403 includes an error image part 312. In this example, the error image part 312 is a device image part showing a status where the paper cassette is open.

(3) Operation of Highlighting Item in Menu Window Image

Figure 11:
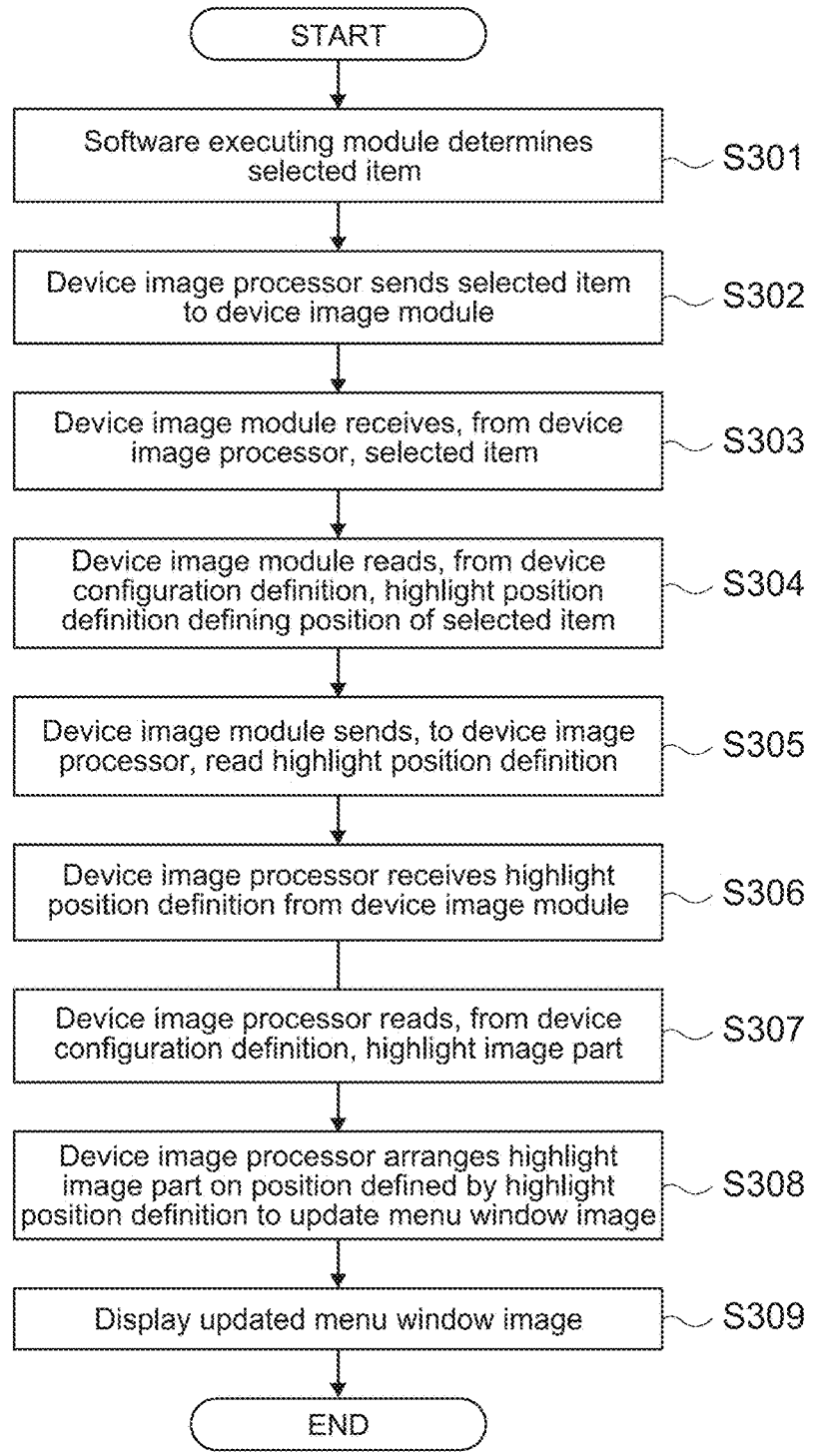
FIG. 11 shows a third operational flow of the information processing apparatus (when highlighting item)

FIG. 11 shows a third operational flow of the information processing apparatus (when highlighting item).

Figure 12:
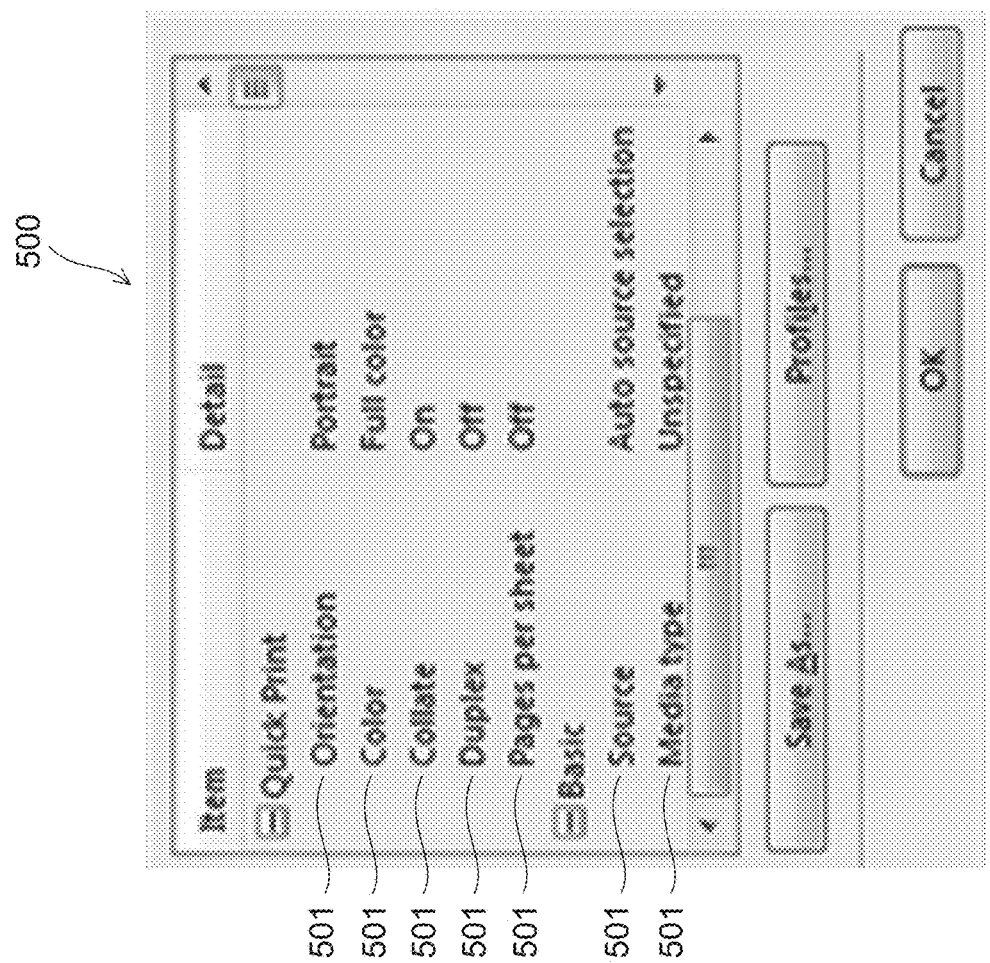
FIG. 12 shows an example of a menu window image including a plurality of items.

FIG. 12 shows an example of a menu window image including a plurality of items.

The present operation will be executed in the status where the software executing module 110 displays the composite image on the display device 17 (Step S112) and in the status where the software executing module 110 displays the menu window image 500 including the plurality of items 501 (FIG. 12) on the display device 17.

The software executing module 110 determines one item, which is selected by a user via the operation device 16, out of the plurality of items included in the menu window image displayed on the display device 17 (Step S301). The software executing module 110 supplies, to the device image processor 111, the one selected item. The device image processor 111 obtains the one selected item. The device image processor 111 sends the one selected item to the device image module 200 (Step S302).

The device image module 200 receives, from the device image processor 111, the one selected item (Step S303). The highlight information determining module 203 of the device image module 200 reads, from the highlight position definition group 340 of the device configuration definition 300, the highlight position definition 341 defining the position of the one selected item (Step S304). The device image module 200 sends, to the device image processor 111, the read highlight position definition 341 (Step S305).

The device image processor 111 receives the highlight position definition 341 from the device image module 200 (Step S306). The device image processor 111 reads, from the image part group 310 of the device configuration definition 300, the highlight image part 313 (Step S307). The device image processor 111 arranges the read highlight image part 313 on a position defined by the received highlight position definition 341 to thereby update the menu window image 500 including the plurality of items 501 (Step S308).

The device image processor 111 causes the software executing module 110 to display the updated menu window image 502 on the display device 17 (Step S309).

Figure 13:
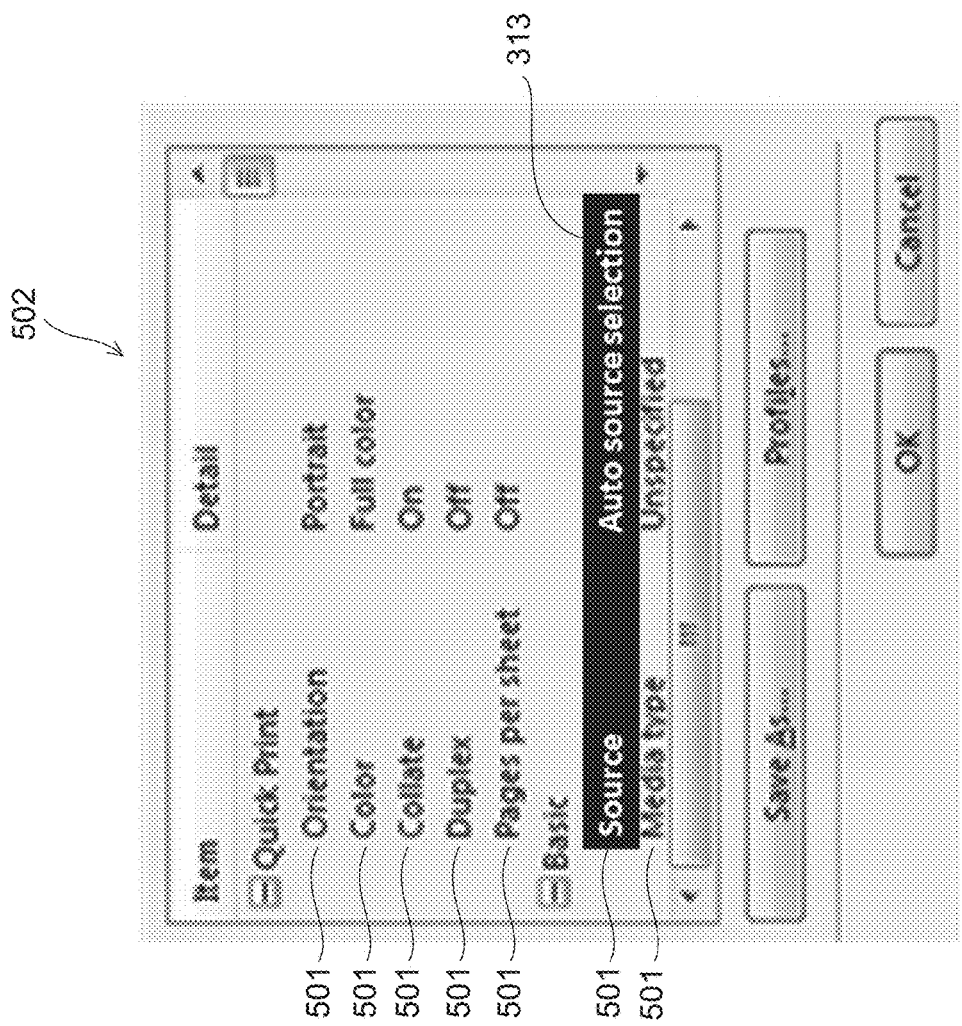
FIG. 13 shows an example of an updated menu window image.

FIG. 13 shows an example of an updated menu window image.

The updated menu window image 502 includes the highlight image part 313 arranged on a position of the item 501 defined by the highlight position definition 341.

Figure 14:
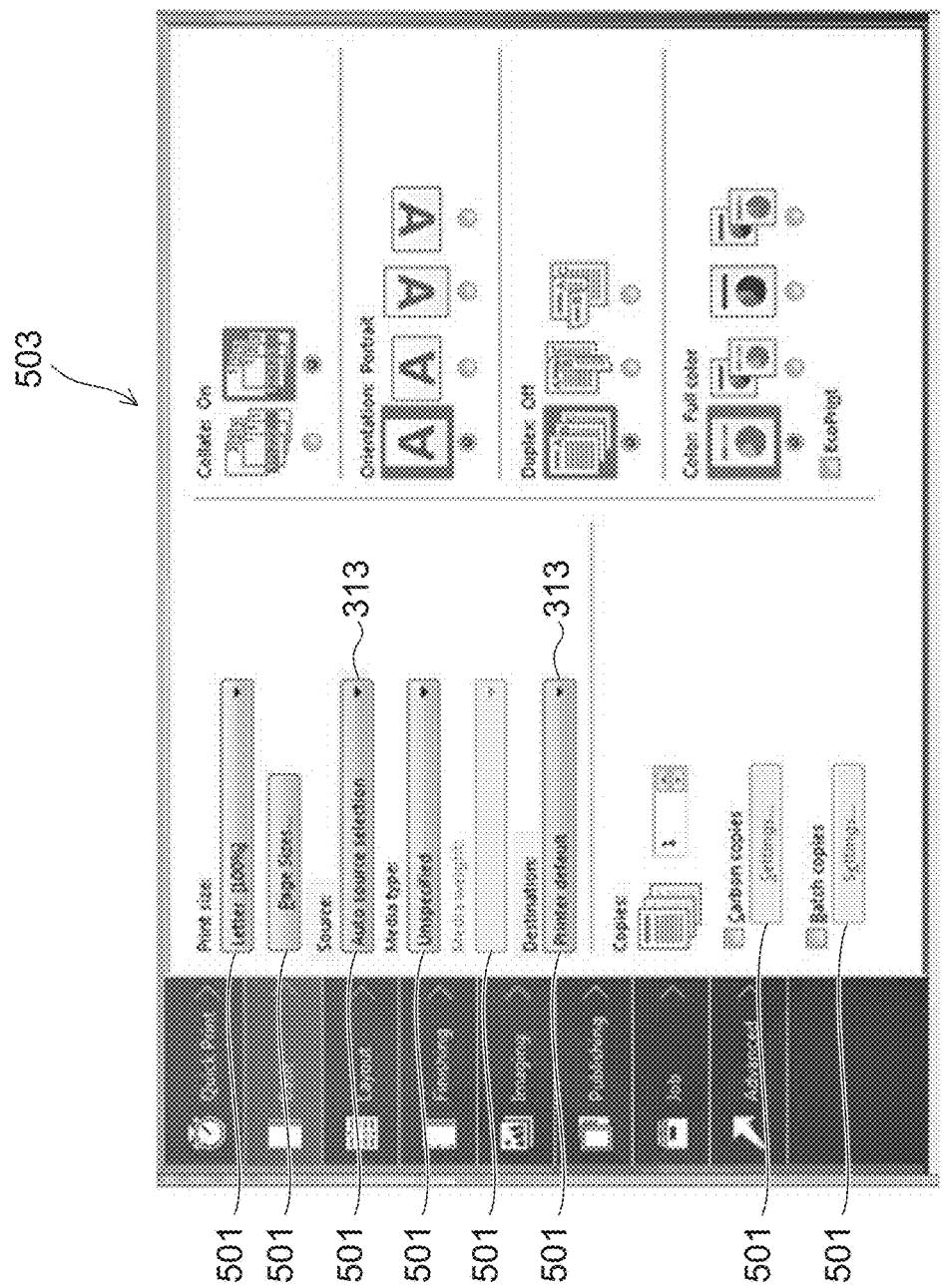
FIG. 14 shows another example of an updated menu window image.

FIG. 14 shows another example of an updated menu window image.

Another updated menu window image 503 includes the highlight image parts 313 arranged on positions of the items 501 defined by the highlight position definition 341.

5. Conclusion

Typically, when an information processing apparatus executes a software program for driving and/or managing an image forming apparatus, the information processing apparatus displays images showing the image forming apparatus and devices actually attached to the image forming apparatus on a display device. When executing a software program for driving an image forming apparatus (for example, printer driver), an information processing apparatus displays the model of the image forming apparatus and the devices optionally attached to the image forming apparatus. Further, when displaying a menu window image, an information processing apparatus displays a selected item (for example, paper cassette, paper output tray) highlighted. When executing a software program for managing an image forming apparatus (for example, device manager software), an information processing apparatus displays a part of the image forming apparatus, in which an error occurs, as follows. For example, a cassette or a door in an open status is displayed, an error icon is displayed, a highlighted item is displayed, or the like. Those images are different depending on not only models of image forming apparatuses but also devices optionally attached to an image forming apparatus.

In order to display the image, therefore, the information processing apparatus determines the model of the image forming apparatus and the devices optionally attached to the image forming apparatus, and generates images of the determined image forming apparatus and devices. Further, in order to display an error, it is necessary for the information processing apparatus to generate different images by highlighting different error parts depending on different models, or to generate different images of devices (paper cassettes, doors, etc.) depending on optionally attached devices. In other words, it is necessary for the information processing apparatus to generate a large number of combinations of images.

In order to generate a large number of combinations of images, according to a conceivable method, for example, a rendering part in Windows (registered trademark) and a data part storing text information necessary to image processing depending on models are configured by using Open GL (Open Graphics Library). According to this method, text information indicating the XYZ positions of every image part information is generated, and a rendering processor module renders every image part. As a result, the rendering processor module renders a 3D animation image. Meanwhile, it is necessary to generate a large number of part information and error information for respective models of image forming apparatuses and respective devices attachable to an image forming apparatus. Because of this, work burdens may be large in order to support new models of image forming apparatuses or new models of devices.

Further, the process of rendering images in RC (Rendering context) by using Open GL and displaying the images on a display (i.e., in association with HDC (Device Context Handle) dedicated to Windows (registered trademark)) is executable only in Windows (registered trademark). However, it is desirable that such process be executable irrespective of differences of platforms such as browsers other than Internet Explorer (registered trademark) and OSs such as Mac (registered trademark) or Linux (registered trademark).

In addition, to a large-size production printer, a larger number of various types of devices are attachable than devices attachable to an MFP. In view of the above, the rendering process may be more and more complicated in the aforementioned method using Open GL.

To the contrary, according to the present embodiment, the information processing apparatus 10 does not define part information necessary to render an image for every device, and does not render the image by a rendering processor module. Instead, according to the present embodiment, the information processing apparatus 10 stores the image parts 311 and 312 in the device configuration definition 300 in association with each model of the image forming apparatus 20. Each of the image parts 311 and 312 is a PNG image prepared for each device, which is physically detachable to the image forming apparatus 20 by user. Further, the information processing apparatus 10 stores the plurality of offset information definitions 351 and 352 of the image parts 311 and 312 in the device configuration definition 300 in association with each model of the image forming apparatus 20.

According to this configuration, depending on the devices actually and physically attached to the image forming apparatus 20 and depending on an error that occurs in the image forming apparatus 20 or a device, the device image module 200 reads the definitions 321 and 331 of the necessary image parts 311 and 312, and reads the corresponding offset information definitions 351 and 352. Then the device image processor 111 arranges, on the basis of the read offset information definitions 351 and 352, the image parts 311 and 312 read on the basis of the definitions 321 and 331. As a result, irrespective of the types and the number of devices actually and physically attached to the image forming apparatus 20 (i.e., even if a large number of devices are attached), it is possible to generate, update, and display composite images without a need of complicated rendering process.

Further, according to the present embodiment, the device image processor 111 depends on the OS 100 and, meanwhile, the device image module 200 is independent of the OS 100. The device image module 200, which is independent of the OS 100, stores the image parts 311 and 312, reads the definitions 321 and 331 of the image parts 311 and 312, and reads the corresponding offset information definitions 351 and 352. Then the OS 100, which depends on the device image processor 111, arranges, on the basis of the read offset information definitions 351 and 352, the image parts 311 and 312 read on the basis of the definitions 321 and 331. As a result, irrespective of the type of the OS 100, it is possible to generate, update, and display composite images reliably on every platform.

It should be understood by those skilled in the art that various modifications, combinations, sub-combinations and alterations may occur depending on design requirements and other factors insofar as they are within the scope of the appended claims or the equivalents thereof

What is claimed is:

1. An information processing apparatus, comprising:
a communication interface configured to communicate with an image forming apparatus;
a display device;
a storage device that stores device configuration definitions including
a plurality of device image parts indicating the image forming apparatus and one or more devices physically attachable to the image forming apparatus, respectively,
a plurality of device image definitions defining the plurality of device image parts with respect to a plurality of device identifiers identifying the image forming apparatus and the one or more devices, respectively, and
a plurality of device offset information definitions defining offset amounts with respect to the plurality of device identifiers, respectively, the offset amounts indicating relative positions of the plurality of device image parts, respectively; and
a processor configured to operate as
a device image processor carried out by a software executing module, the software executing module being configured to execute a software program for driving and/or managing the image forming apparatus on an OS (Operation System), and
a device image module configured to communicate with the device image processor,
the device image processor being configured to
obtain a plurality of device identifiers identifying the image forming apparatus and one or more devices actually attached to the image forming apparatus, respectively, the plurality of device identifiers being received by the software executing module from the image forming apparatus, and
send the plurality of obtained device identifiers to the device image module,
the device image module being configured to
receive the plurality of device identifiers from the device image processor,
read, from the device configuration definition, a plurality of device image definitions defined with respect to the plurality of received device identifiers, respectively,
read, from the device configuration definition, a plurality of device offset information definitions defined with respect to the plurality of received device identifiers, respectively, and
send the plurality of read device image definitions and the plurality of read device offset information definitions to the device image processor,
the device image processor being configured to
receive the plurality of device image definitions and the plurality of device offset information definitions from the device image module,
read, from the device configuration definition, a plurality of device image parts defined by the plurality of received device image definitions,
arrange the plurality of read device image parts on a plurality of offset positions defined by the plurality of received device offset information definitions, respectively, to thereby generate a composite image, and
cause the software executing module to display the composite image on the display device.

2. The information processing apparatus according to claim 1, wherein
the storage device stores a plurality of the device configuration definitions,
the plurality of device configuration definitions are in one-to-one association with a plurality of model identifiers identifying a plurality of models of image forming apparatuses, respectively,
the device image processor is configured to
obtain, as the device identifier identifying the image forming apparatus received by the software executing module from the image forming apparatus, a model identifier identifying a model of the image forming apparatus, and
send the obtained model identifier to the device image module, and
the device image module is configured to
receive the model identifier from the device image processor, and
use a device configuration definition in association with the model identifier.

3. The information processing apparatus according to claim 1, wherein
the device configuration definition further includes
one or more error image parts,
device error definitions defining the one or more error image parts with respect to one or more error identifiers, respectively, the one or more error identifiers identifying one or more error types, respectively, and
a plurality of error offset information definitions with respect to the one or more error identifiers and the plurality of device identifiers, respectively, the plurality of error offset information definitions defining relative positions of the one or more error image parts with respect to the plurality of device image parts, respectively,
the device image processor is configured to
obtain an error identifier and a device identifier identifying one of the image forming apparatus or the one or more devices, in which an error occurs, the error identifier and the device identifier being received by the software executing module from the image forming apparatus, and send the error identifier and the device identifier to the device image module, the device image module is configured to receive the error identifier and the device identifier from the device image processor, read, from the device configuration definition, a device error definition defined with respect to the received error identifier, read, from the device configuration definition, an error offset information definition defined with respect to the received error identifier and the received device identifier, and send the read device error definition and the read error offset information definition to the device image processor, and the device image processor is configured to receive the device error definition and the error offset information definition from the device image module, read, from the device configuration definition, an error image part defined by the received device error definition, arrange the read error image part on an offset position defined by the received error offset information definition to thereby update the composite image including the plurality of device image parts, and cause the software executing module to display the updated composite image on the display device.

4. The information processing apparatus according to claim 1, further comprising:

an input device, wherein the software executing module is configured to display a menu window image including a plurality of items on the display device, and determine one item out of the plurality of items included in the menu window image displayed on the display device, the one item being selected via the input device, the device configuration definition further includes a highlight image part for highlighting one item out of the plurality of items included in the menu window image, and a plurality of highlight position definitions defining a plurality of positions of the plurality of items with respect to the menu window image, respectively, the device image processor is configured to send, to the device image module, one item selected by the software executing module, the device image module is configured to receive the one item from the device image processor, read, from the device configuration definition, a highlight position definition defining a position of the one item, and send the read highlight position definition to the device image processor, and the device image processor is configured to receive the highlight position definition from the device image module, read, from the device configuration definition, the highlight image part, arrange the read highlight image part on a position defined by the received highlight position definition to thereby update the menu window image, and cause the software executing module to display the updated menu window image on the display device.

\* \* \* \* \*